(12) United States Patent
Choi

(10) Patent No.: US 10,802,640 B2
(45) Date of Patent: Oct. 13, 2020

(54) TOUCH DISPLAY DEVICE

(71) Applicant: LG DISPLAY CO., LTD., Seoul (KR)

(72) Inventor: Jinhyuk Choi, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 876 days.

(21) Appl. No.: 15/225,658

(22) Filed: Aug. 1, 2016

(65) Prior Publication Data

US 2017/0285830 A1    Oct. 5, 2017

(30) Foreign Application Priority Data

Apr. 1, 2016 (KR) .................. 10-2016-0039915

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0412* (2013.01); *G06F 3/0416* (2013.01); *G06F 2203/04107* (2013.01)

(58) Field of Classification Search
CPC .... G06F 3/0414; G06F 3/0412; G06F 3/0416; G06F 3/044; G06F 2203/04107
See application file for complete search history.

(56) References Cited

U.S. PATENT DOCUMENTS

| | | | | |
|---|---|---|---|---|
| 9,501,195 | B1 * | 11/2016 | Kim | G02F 1/13439 |
| 2014/0085549 | A1 * | 3/2014 | Lin | G06F 1/1601 |
| | | | | 349/12 |
| 2016/0062500 | A1 * | 3/2016 | Kessler | G06F 3/0414 |
| | | | | 345/174 |
| 2016/0092015 | A1 * | 3/2016 | Al-Dahle | G06F 3/044 |
| | | | | 345/174 |
| 2017/0090637 | A1 * | 3/2017 | Yoon | H04M 1/0266 |
| 2017/0242541 | A1 * | 8/2017 | Iuchi | G06F 3/044 |
| 2017/0262112 | A1 * | 9/2017 | Noguchi | G02F 1/134336 |
| 2017/0277328 | A1 * | 9/2017 | Kurasawa | G06F 3/0416 |
| 2018/0004336 | A1 * | 1/2018 | Shepelev | G06F 3/0416 |
| 2018/0232075 | A1 | 8/2018 | Yang et al. | |

FOREIGN PATENT DOCUMENTS

| | | |
|---|---|---|
| CN | 103363399 A | 10/2013 |
| CN | 103699257 A | 4/2014 |
| CN | 104992627 A | 10/2015 |
| CN | 105068695 A | 11/2015 |
| CN | 204965385 U | 1/2016 |
| CN | 204965387 U | 1/2016 |
| CN | 205015863 U | 2/2016 |

(Continued)

*Primary Examiner* — Antonio Xavier
(74) *Attorney, Agent, or Firm* — Birch, Stewart, Kolasch & Birch, LLP

(57) ABSTRACT

A touch display device according to an embodiment includes a display panel having a plurality of touch electrodes disposed therein and a cover bottom disposed below the backlight unit. At least one touching force sensing gap is present between the display panel and the cover bottom. A specific voltage is applied to the cover bottom. The touch display device not only can sense the position of a touch made by a user but also an amount of touching force with which the user presses against the display panel. The touch display device can provide a wider range of functions.

16 Claims, 10 Drawing Sheets

(56) References Cited

FOREIGN PATENT DOCUMENTS

| | | |
|---|---|---|
| CN | 105404036 A | 3/2016 |
| CN | 105425403 A | 3/2016 |
| CN | 105426013 A | 3/2016 |
| KR | 10-2008-0073769 A | 8/2008 |
| KR | 10-2012-0103062 A | 9/2012 |
| KR | 10-2014-0123025 A | 10/2014 |
| KR | 10-2015-0124431 A | 11/2015 |
| KR | 10-2016-0025161 A | 3/2016 |
| TW | 201305879 A1 | 2/2013 |

* cited by examiner

TOUCH DISPLAY DEVICE

CROSS REFERENCE TO THE RELATED APPLICATION

This application claims priority from Korean Patent Application No. 10-2016-0039915 filed on Apr. 1, 2016, which is hereby incorporated by reference for all purposes as if fully set forth herein.

BACKGROUND OF THE INVENTION

Field of the Invention

The present invention relates to a touch display device.

Description of the Related Art

In response to the development of the information society, demands for a variety of display devices for displaying images are increasing. In this regard, a range of display devices, such as liquid crystal display (LCD) devices, plasma display panels (PDPs), and organic light-emitting display devices, are used.

Among display devices, small display devices used in mobile display devices, such as smartphones and tablets, and medium-sized or larger display devices, such as smart TVs, provide a touch-based user interface for user convenience according to various device characteristics.

Such display devices providing touch-based user interfaces are being developed to provide a wider range of functions, and user demands are also becoming ever more diverse.

However, currently available touch-based user interfaces are only designed to detect a point touched by a user (touch coordinates) and execute input processing at the sensed touch position. Current touch-type user interfaces are limited in their ability to provide a large number of functions in a range of types and shapes and must satisfy a large number of user demands.

SUMMARY OF THE INVENTION

Various aspects of the present invention provide a touch display device not only able to sense touched coordinates (i.e. a touch position) when a touch has occurred, but also able to sense an amount of touching force with which a user presses against the display panel during the touch.

Also provided is a touch display device able to use existing components as force sensors for a force sensing operation without including additional separate structures or members as the force sensors, whereby the touch display device can be compact and easy to fabricate.

Also provided is a touch display device having a touching force sensing structure able to improve image quality.

Also provided is a touch display device having a touching force sensing structure able to increase a side viewing angle.

Also provided is a touch display device having a touching force sensing structure able to improve the optical characteristics of a backlight unit.

Also provided is a touch display device having a touching force sensing structure allowing a narrow bezel design to be effectively realized.

According to an aspect of the present invention, a touch display device may include: a display panel having a plurality of touch electrodes disposed therein, a first driving signal being applied to the plurality of touch electrodes; a backlight unit disposed below the display panel; and a cover bottom disposed below the backlight unit.

At least a portion of the cover bottom is spaced apart from the backlight unit to form a gap.

A second driving signal may be applied to the cover bottom while the first driving signal is being applied to at least one touch electrode among the plurality of touch electrodes.

The cover bottom may support a bottom margin of the backlight unit.

In an area in which the cover bottom supports the bottom margin of the backlight unit, the cover bottom may have an upwardly-protruding portion supporting the bottom margin of the backlight unit or the backlight unit may have a downwardly-protruding portion protruding from the bottom margin thereof toward the cover bottom.

A portion of the cover bottom supporting the bottom margin of the backlight unit may be bonded to the bottom margin of the backlight unit via a bonding material.

The thickness of the bonding material bonding the portion of the cover bottom supporting the bottom margin of the backlight unit to the bottom margin of the backlight unit may correspond to the distance between the backlight unit and the cover bottom.

The bonding material bonding the portion of the cover bottom supporting the bottom margin of the backlight unit to the bottom margin of the backlight unit may include: a first bonding material bonded to the bottom margin of the backlight unit; and a second bonding material bonding the first bonding material to the cover bottom.

A total of the thickness of the first bonding material and the thickness of the second bonding material may correspond to the distance between the backlight unit and the cover bottom.

The width of the first bonding material is smaller than the width of the second bonding material.

The backlight unit and the display panel may be spaced apart from each other via a gap-forming member.

The gap-forming member may be at least one selected from among a bonding material, an upwardly-protruding portion of the backlight unit, a downwardly-protruding portion of the display panel, and other structures.

The cover bottom may include: a body disposed below the backlight unit; and a side section disposed on a side of the backlight unit.

The side section may support the bottom margin of the display panel.

An uppermost point of the side section may be positioned higher than the top surface of the backlight unit in the direction of the display panel.

The backlight unit and the display panel may be spaced apart from each other due to the difference in the height between the uppermost point of the side section and the top surface of the backlight unit.

An adhesive may be bonded to an outer surface of the side section of the cover bottom and a side surface of the display panel.

In the touch display device, in a driving period for sensing an amount of touching force, the first driving signal may be applied to at least one touch electrode among the plurality of touch electrodes, while the second driving signal may be applied to the cover bottom.

The touch display device may further include a touch circuit. In a state in which the second driving signal is applied to the cover bottom, after the first driving signal has been applied to the at least one touch electrode among the plurality of touch electrodes, the touch circuit may determine at least one among presence, magnitude, and level of touching force by receiving a signal through the at least one touch electrode.

The first driving signal may be a pulse signal or a signal having a DC voltage, while the second driving signal may be a pulse signal or a signal having a DC voltage.

The first driving signal and the second driving signal have a voltage difference or a phase difference therebetween.

For example, when the second driving signal is a signal having a DC voltage, the second driving signal may be a signal having a ground voltage.

The gap by which the backlight unit and the cover bottom are spaced apart from each other may be an air gap or a dielectric gap.

That is, an air gap or a dielectric material may be present in the space by which the backlight unit and the cover bottom are spaced apart from each other.

The at least one gap may have a variable size.

According to another aspect of the present invention, a touch display device may include: a display panel having a plurality of touch electrodes disposed therein, a first driving signal being applied to the plurality of touch electrodes; and a cover bottom disposed below the backlight unit.

In the touch display device, at least one gap may be present between the display panel and the cover bottom.

At least a portion of the cover bottom may be formed of a conductive material or the composition of the cover bottom may include a conductive material.

In the touch display device, a second driving signal may be applied to the cover bottom while the first driving signal is being applied to at least one touch electrode among the plurality of touch electrodes.

According to further another aspect of the present invention, a touch display device may include: a display panel having a plurality of touch electrodes disposed therein, a first driving signal being applied to the plurality of touch electrodes; a cover bottom disposed below the backlight unit; and a conductive plate disposed on the cover bottom.

A second driving signal may be applied to the conductive plate while the first driving signal is being applied to at least one touch electrode among the plurality of touch electrodes.

At least one gap may be present between the display panel and the conductive plate.

The at least one gap may have a variable size.

According to the present disclosure as set forth above, the touch display device not only can sense touched coordinates (i.e. a touch position) when a touch has occurred but also sense an amount of touching force with which a user presses against the display panel to cause the touch.

In addition, the touch display device uses the existing components (e.g. the touch electrodes TE, the cover bottom CB, or so on) as the force sensors without additionally including separate structures or members as the force sensors, whereby the touch display device can be compact and easy to fabricate.

Furthermore, the touch display device has a touching force sensing structure able to improve image quality.

In addition, the touch display device has the touching force sensing structure (the dual gap structure) able to increase a side viewing angle.

Furthermore, the touch display device has the touching force sensing structure (the dual gap structure) able to improve the optical characteristics of the backlight unit.

In addition, the touch display device has the touching force sensing structure (the dual gap structure) allowing a narrow bezel design to be effectively realized.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION OF THE EMBODIMENTS

Figure 1:
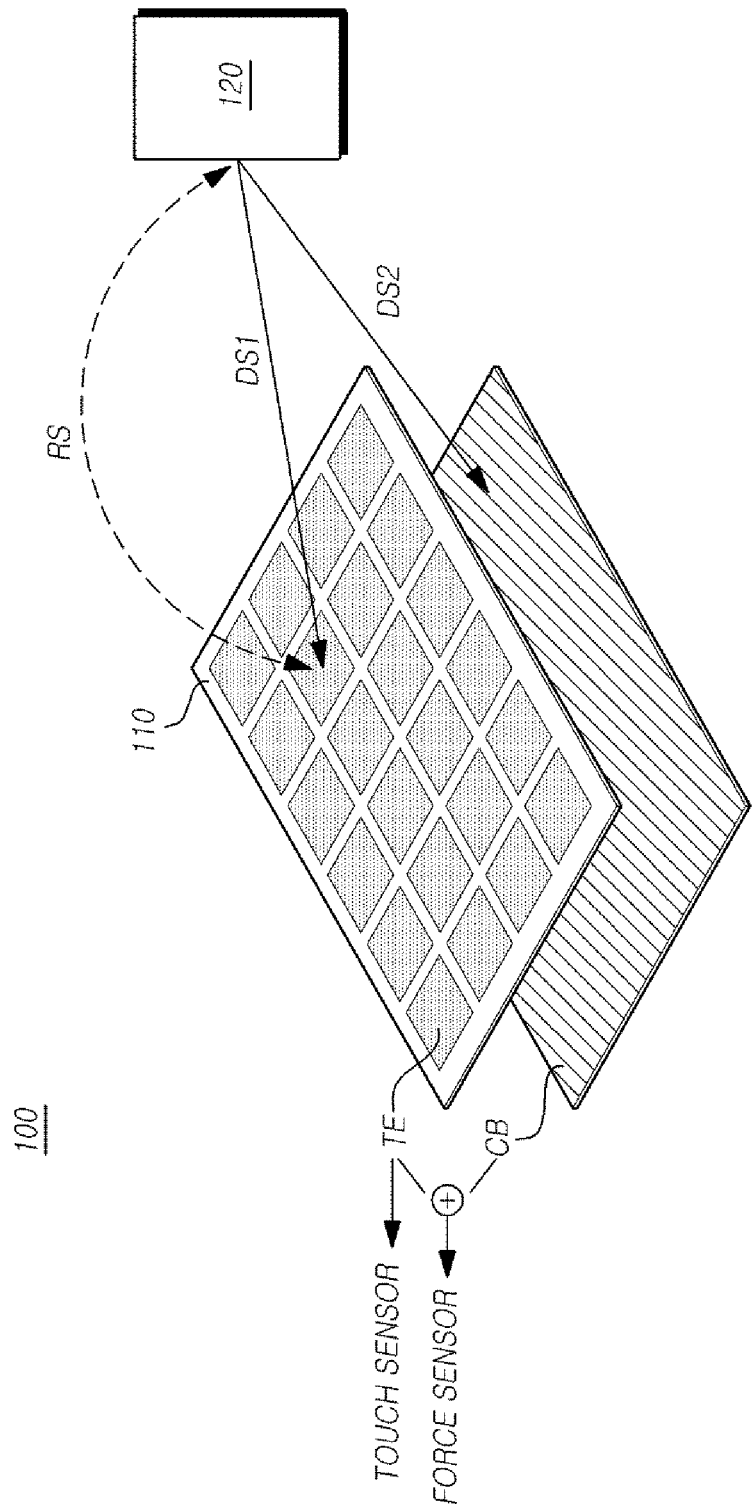
FIG. 1 is a configuration view schematically illustrating a touch display device according to an embodiment of the present invention.

Hereinafter, reference will be made to embodiments of the present disclosure in detail, examples of which are illustrated in the accompanying drawings. Throughout this document, reference should be made to the drawings, in which the same reference numerals and signs will be used to designate the same or like components.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to," "coupled to," or "fastened to" another element, not only can it be "directly connected, coupled, or fastened to" the other element, but it can also be "indirectly connected, coupled, or fastened to" the other element via an "intervening" element.

Figure 2:
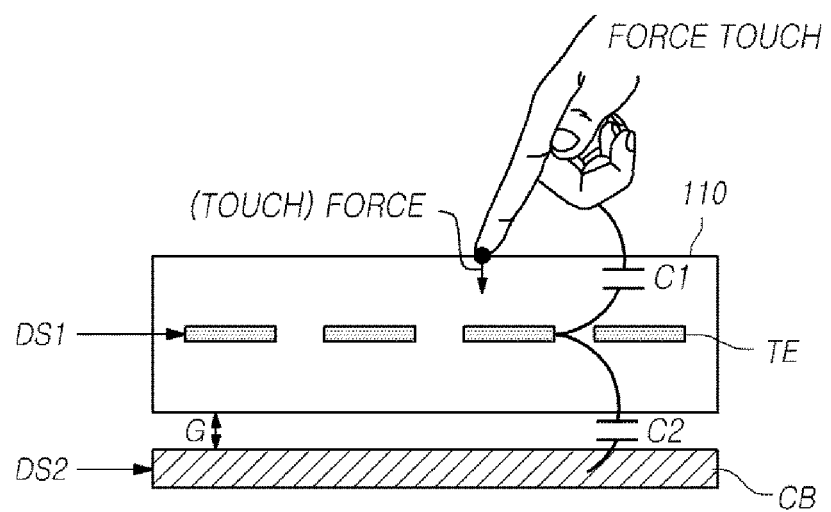
FIG. 2 is a schematic cross-sectional view of the touch display device according to tan embodiment of the present invention.
Figure 3:
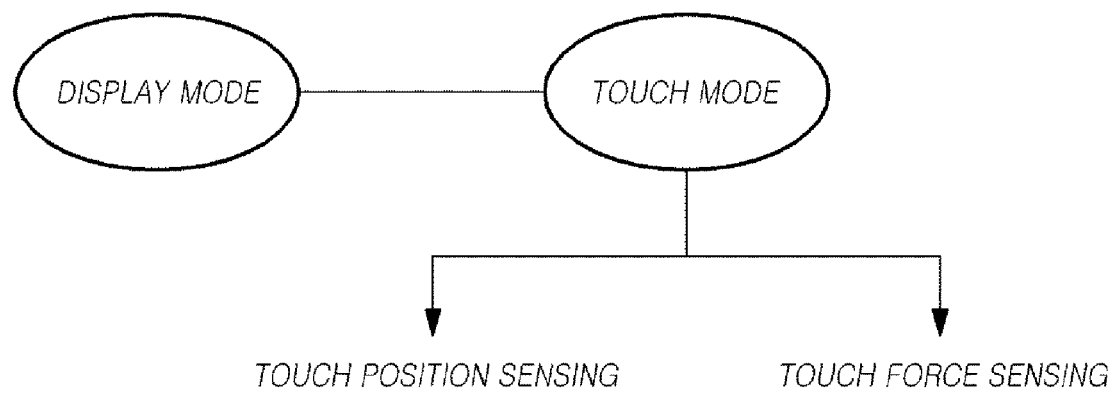
FIG. 3 illustrates operating modes of the touch display device according to an embodiment of the present invention.

FIG. 1 is a configuration view schematically illustrating a touch display device 100 according to an embodiment of the present invention, FIG. 2 is a schematic cross-sectional view of the touch display device 100 according to the embodiment of the present invention, and FIG. 3 illustrates operating modes of the touch display device 100 according to the embodiment of the present invention.

Referring to FIG. 1 to FIG. 3, the touch display device 100 according to the embodiment is a display device providing an image display function and a touch sensing function to sense a touch made by a user.

Referring to FIG. 3, the touch display device 100 according to the embodiment operates in display mode to provide an image display function and operates in touch mode to provide the touch sensing function.

When the touch display device 100 according to the embodiment operates in the display mode, the touch display device 100 displays images by driving data lines and gate lines disposed on a display panel 110.

When the touch display device 100 according to the embodiment operates in the touch mode, the touch display device 100 can provide not only the touch position sensing function to sense whether or not a touch has occurred and a touch position when the touch is made by a pointer, but also a touching force sensing function to sense an amount of touching force (also simply referred to as "force") corresponding to pressure applied to the display panel 110 when the display panel 110 is touched.

The term "touch" used herein means an action in which the user contacts the display panel 110 using the pointer.

The touch may be a "soft touch" in which the display panel 110 is pressed by force (pressure) equal to or less than a predetermined magnitude and a "force touch" in which the display panel 110 is pressed by force (pressure) greater than the predetermined magnitude.

The touch position (also referred to as the "touched coordinates") caused by soft touch or force touch means the position of a point on the display panel 110 that has been touched by the pointer.

In addition, the term "touching force" means an amount of force (pressure) by which the user presses against the display panel 110 when touching the display panel 110 with the pointer.

The pointer may be a conductive pointer, such as a portion of a human body, for example, a finger, or a pen, a panel contact portion of which is formed of a conductive material. Alternatively, the pointer may be a nonconductive pointer, such as a pen, a panel contact portion of which is formed of a nonconductive material.

A pointer allowing a touch position to be sensed must be a conductive pointer.

In contrast, a pointer allowing touching force to be sensed may not only be a conductive pointer but also a nonconductive pointer.

Referring to FIG. 1 and FIG. 2, the touch display device 100 according to the exemplary embodiments includes a plurality of touch electrodes TE disposed within the display panel 110 to provide a touch position sensing function.

The touch display device 100 according to the exemplary embodiments can sequentially apply a first driving signal DS1 to the plurality of touch electrodes TE and recognize changes in capacitances C1 between the touch electrodes TE and the pointer based on signals RS received from the touch electrodes TE to sense a touch position. In this manner, the touch display device 100 provides the touch position sensing function.

The plurality of touch electrodes TE disposed within the display panel 110 to enable the touch position sensing function may be referred to as "touch sensors."

Referring to FIG. 1 and FIG. 2, the touch display device 100 according to the embodiment may utilize two types of electrodes to provide the touching force sensing function.

The two types of electrodes for providing the touching force sensing function include the plurality of touch electrodes TE disposed within the display panel 110 and a counter electrode that forms second capacitances C2 together with the plurality of touch electrodes TE.

The counter electrode may be positioned outside of the display panel 100.

As illustrated in FIG. 1 and FIG. 2, in the touch display device 100 according to the exemplary embodiments, the counter electrode may be implemented as a cover bottom CB used in the fastening (supporting), assembling and protecting of the display panel 110.

The touch display device 100 according to the exemplary embodiments provides the touching force sensing function by applying a first driving signal DS1 to at least one touch electrode among the plurality of touch electrodes TE and applying a second driving signal DS2 having a specific voltage to the cover bottom CB in a predetermined driving period set to sense touching force.

The second driving signal DS2 may be applied to the cover bottom CB only in a driving period for sensing touching force or may be continuously applied to the cover bottom CB in periods other than the driving period for sensing touching force.

The plurality of touch electrodes TE and the cover bottom CB able to be simultaneously driven to sense touching force may be collectively referred to as "touch sensors."

In the driving period for sensing touching force, the touch display device 100 according to the embodiment may apply the first driving signal DS1 to at least one touch electrode among the plurality of touch electrodes TE, apply the second driving signal DS2 having a specific voltage to the cover bottom CB, and then sense touching force based on a signal RS received through the at least one touch electrode TE.

In this regard, the touch display device 100 according to the embodiment further includes a touch circuit 120 to sense a touch position and sense touching force.

The touch circuit 120 may sequentially apply the first driving signal DS1 to the plurality of touch electrodes TE to sense the touch position based on the signal RS received through each of the touch electrodes TE.

In addition, the touch circuit 120 may sense touching force by applying the first driving signal DS1 to at least one touch electrode among the plurality of touch electrodes TE in the state in which the second driving signal DS2 having a specific voltage is applied to the cover bottom CB and then determining at least one of the presence, magnitude, and level of touching force based on the signal RS received through at least one touch electrode TE.

The touch circuit 120 may include a power circuit supplying the first driving signal DS1 and the second driving signal DS2, a driving circuit applying the first driving signal DS1 to the plurality of touch electrodes TE, a signal transferring circuit applying the second driving signal DS2 to the cover bottom CB, a micro-control unit sensing a touch position and/or touching force based on the signal RS received from each of the touch electrodes TE.

The power circuit, the driving circuit, the micro-control unit, and other circuits may be implemented as separate integrated circuits (ICs).

Alternatively, two or more of the power circuit, the driving circuit, the micro-control unit, and other circuits may be implemented as a single IC.

The use of the above-described touch circuit 120 can perform driving and sensing processing to sense not only a touch position but also touching force. In addition, the touch circuit 120 detects a signal through the same position (touch electrode) to sense the touch position and touching force, whereby the number of signal sensing components may be reduced.

The plurality of touch electrodes TE may operate not only as the touch sensors and the force sensors in a touch mode period but also as display driving electrodes to which display driving voltages are applied in a display mode period.

For example, the plurality of touch electrodes TE may be common electrodes to which a common voltage Vcom, corresponding to a display driving voltage, is applied for the display mode period.

When the plurality of touch electrodes TE are used as the display driving electrodes as described above, the plurality of touch electrodes TE perform three roles as the touch sensors, the force sensors, and the display driving electrodes.

Driving for touch position sensing and driving for touching force sensing may be separately performed at different times or may be performed simultaneously.

When driving for touch position sensing and driving for touching force sensing are simultaneously performed, the touch display device 100 according to the embodiment may sequentially apply the first driving signal DS1 to the plurality of touch electrodes TE and apply the second driving signal DS2 having a specific voltage to the cover bottom CB. Afterwards, based on the signals RS received through the touch electrodes TE, the touch display device 100 may determine a touch position by recognizing a change in the first capacitance C1 between each of the touch electrodes TE and the pointer and determine at least one of the presence, magnitude and level of touching force by recognizing a change in the second capacitance C2 between each of the touch electrodes TE and the cover bottom CB.

As described above, the touch display device 100 according to the embodiment includes the display panel 110 having the plurality of touch electrodes TE disposed therein and the cover bottom CB disposed below the display panel 110 to sense a touch position and touching force.

In the touch display device 100 according to the embodiment, at least a portion of the cover bottom CB may be formed of a conductive material or the composition of the cover bottom CB may include a conductive material, such that the second driving signal DS2 having a specific voltage can be applied thereto.

In addition, in the touch display device 100 according to the exemplary embodiments, at least one gap G may be present between the display panel 110 and the cover bottom CB to enable slight bending of the display panel during touching force sensing.

As described above, the touch display device 100 is able to sense both a touch position and touching force.

In addition, since the touch electrodes TE for sensing a touch position and the cover bottom CB used for fastening (supporting), assembling and protecting are used as two types of force sensors as described above, the touch display device 100 can have a compact force sensing structure with a reduced number of components for touching force sensing.

Due to at least one gap G present between the display panel 110 and the cover bottom CB, the second capacitance C2 may be formed by touching force between each of the plurality of touch electrodes TE and the cover bottom CB.

The size (thickness) of the at least one gap G present between the display panel 110 and the cover bottom CB may vary depending on the amount of touching force.

When touching force is applied, the size of the at least one gap present between the display panel 110 and the cover bottom CB changes, allowing the second capacitance C2 between the touch electrode TE and the cover bottom CB to vary depending on the touching force, whereby the touching force can be sensed.

The at least one gap G present between the display panel 110 and the cover bottom CB may be, for example, an air gap or a dielectric gap.

As described above, the gap G (e.g. an air gap or a dielectric gap) may be formed between the display panel 110 and the cover bottom CB.

In the touch display device 100, driving for touch position sensing and driving for touching force sensing may be performed separately or simultaneously.

When driving for sensing a touch position and driving for sensing touching force, each touch mode period may be a driving period for sensing the touch position or a driving period for sensing touching force, or may include a driving period for sensing a touch position and a driving period for sensing touching force.

When driving for touch position sensing and driving for touching force sensing are performed simultaneously, the touch electrodes TE and the cover bottom CB are simultaneously driven for one or more touch mode periods to sense the touch position and touching force through signals RS received through the touch electrodes TE.

Figure 4:
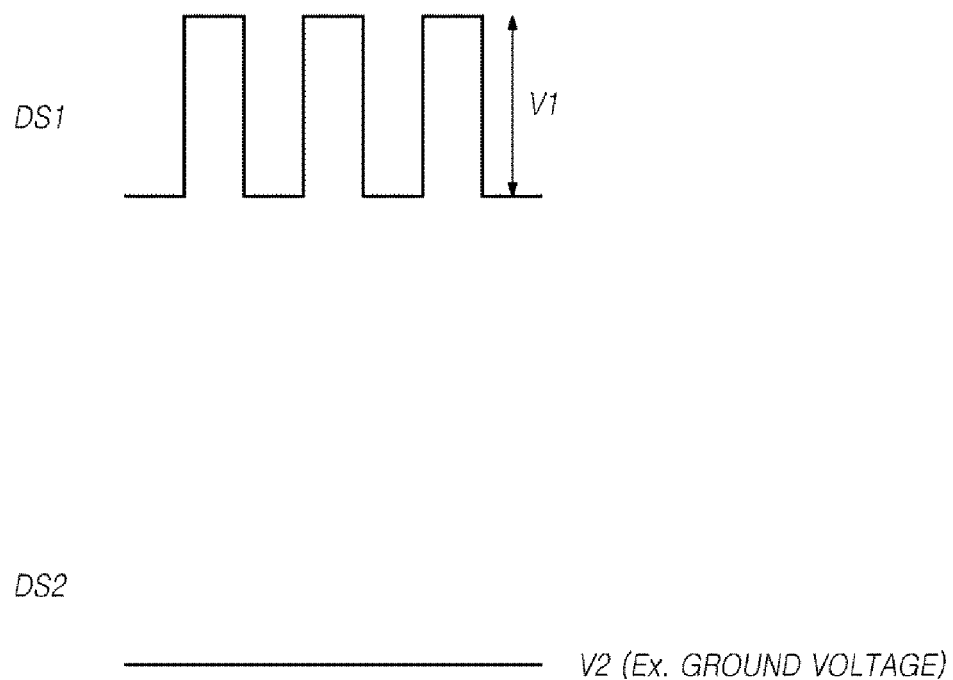
FIG. 4 illustrates a first driving signal and a second driving signal for touching force sensing in the touch display device according to an embodiment of the present invention.

FIG. 4 illustrates a first driving signal DS1 and a second driving signal DS2 for touching force sensing in the touch display device 100 according to an embodiment of the present invention.

Each of the first driving signal DS1 and the second driving signal DS2 applied to the touch electrodes to sense the touching force of the touch display device 100 according to the embodiment may be a pulse signal or a signal having a DC voltage.

Although each of the first driving signal DS1 and the second driving signal DS2 may have a variety of shapes, in the embodiment a voltage difference (or a potential difference) is present between the first driving signal DS1 and the second driving signal DS2 to sense touching force.

For example, as illustrated in FIG. 4, the first driving signal DS1 applied to the touch electrodes TE is a pulse signal having an amplitude of a V1 voltage, while the second driving signal DS2 applied to the cover bottom CB may be a signal having a ground voltage as a specific voltage V2.

Depending on the signal waveforms of the first driving signal DS1 and the second driving signal DS2, differences in the voltage between the touch electrodes TE and the cover bottom CB may occur. This consequently forms second capacitances C2 between the touch electrodes TE and the cover bottom CB, whereby touching force sensing is enabled.

The touch display device 100 as described above may be one of a range of display devices, such as a liquid crystal display (LCD) device, an organic light-emitting display device, and a plasma display panel (PDP).

Hereinafter, a more detailed structure for touching force sensing will be described in the case that the touch display device 100 according to the embodiment is an LCD device.

FIG. 5 to FIG. 8 illustrate example touching force sensing structures of the touch display device 100 according to the embodiments.

Referring to FIG. 5 to FIG. 8, the touch display device 100 according to the embodiments further include a backlight unit BLU situated between the display panel 110 and the cover bottom CB.

In the embodiments, at least one gap G is present between the display panel 110 and the cover bottom CB. A first gap G1 may be present between the display panel 110 and the backlight unit BLU.

A second gap G2 may be present between the backlight unit BLU and the cover bottom CB.

In other words, all or a portion of the cover bottom CB may be spaced apart from the backlight unit BLU to form at least one gap G.

Both the first gap G1 between the display panel 110 and the backlight unit BLU and the second gap G2 between the backlight unit BLU and the cover bottom CB may be formed.

The size of the first gap G1 present between the display panel 110 and the backlight unit BLU may change when force (touching force) by which the display panel 110 is pressed in the top-to-bottom direction is applied.

When force (touching force) by which the display panel 110 is pressed in the top-to-bottom direction has been applied, the size of the second gap G2 present between the backlight unit BLU and the cover bottom CB may or may not change, depending on whether the backlight unit BLU can be bent.

When only the first gap G1 is present between the display panel 110 and the backlight unit BLU, the size (thickness) of the first gap G1 between the display panel 110 and the backlight unit BLU must be increased to improve the efficiency and accuracy of touching force sensing. This, however, may increase the possibility that light exiting the backlight unit BLU may be lost before arriving at the display panel 110, thereby degrading optical characteristics.

In addition, when the size (thickness) of the first gap G1 between the display panel 110 and the backlight unit BLU is increased, a side viewing angle may be necessarily restricted. To increase the side viewing angle, a bezel must be increased. However, an increase in the size (thickness) of the first gap G1 between the display panel 110 and the backlight unit BLU makes it difficult to design a narrow bezel.

In contrast, the dual gap structure formed between the display panel 110 and the cover bottom CB as described above can reduce the size (thickness) of the first gap G1 between the display panel 110 and the backlight unit BLU, thereby improving the optical characteristics of the backlight unit BLU.

In addition, since the dual gap structure formed between the display panel 110 and the cover bottom CB can reduce the size (thickness) of the first gap G1 between the display panel 110 and the backlight unit BLU, the side viewing angle can be increased, thereby facilitating the designing of a narrow bezel and improving image quality.

Hereinafter, reference will be made to the dual gap structure, i.e. a first gap-forming structure that separates the display panel 110 and the backlight unit BLU from each other to form the first gap G1 and a second gap-forming structure that separates the backlight unit BLU and the cover bottom CB from each other to form the second gap G2.

First, the second gap-forming structure that separates the backlight unit BLU and the cover bottom CB from each other to form the second gap G2 will be described.

Referring to FIG. 5 to FIG. 8, the cover bottom CB is situated below the backlight unit BLU.

The cover bottom CB may support only the bottom margins (i.e. margins along the border of the bottom surface) of the backlight unit BLU rather than supporting the entirety of the bottom surface of the backlight unit BLU through direct contact therewith.

Thus, the other portions of the bottom surface of the backlight unit BLU other than the margins are spaced apart from the cover bottom CB, whereby the second gap G2 may be formed between the backlight unit BLU and the cover bottom CB.

Figure 5:
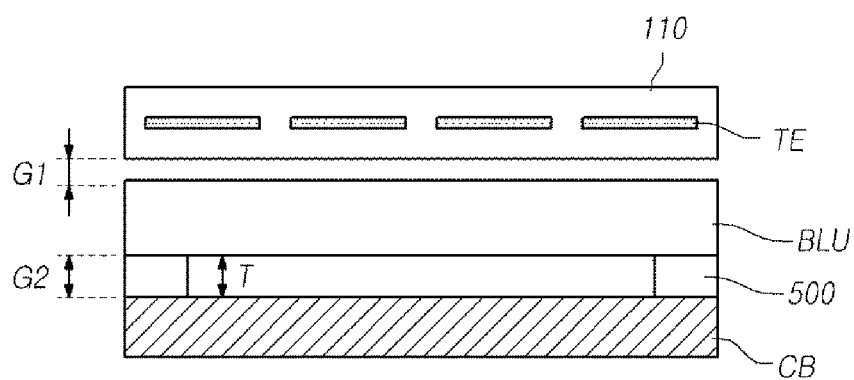
FIG. 5 illustrates a touching force sensing structure of the touch display device according to an embodiment of the present invention.

Referring to FIG. 5, the portions of the cover bottom CB supporting the bottom margins of the backlight unit BLU may be bonded to the bottom margins of the backlight unit BLU via a bonding material 500.

Referring to FIG. 5, portions of the cover bottom CB (the portions of the cover bottom CB supporting the bottom margins of the backlight unit BLU) may be bonded to the bottom margins of the backlight unit BLU via the bonding material 500 having a predetermined thickness T.

The thickness T of the bonding material 500 may correspond to the size of the second gap G2 when touching force has not occurred on the top portion of the display panel 110.

That is, the thickness T of the bonding material 500 may be equal to the size (thickness) of the second gap G2 corresponding to the distance between the backlight unit BLU and the cover bottom CB.

Thus, the backlight unit BLU and the cover bottom CB are spaced apart from each other while being coupled to each other, whereby the second gap G2 can be formed between the backlight unit BLU and the cover bottom CB.

Figure 6:
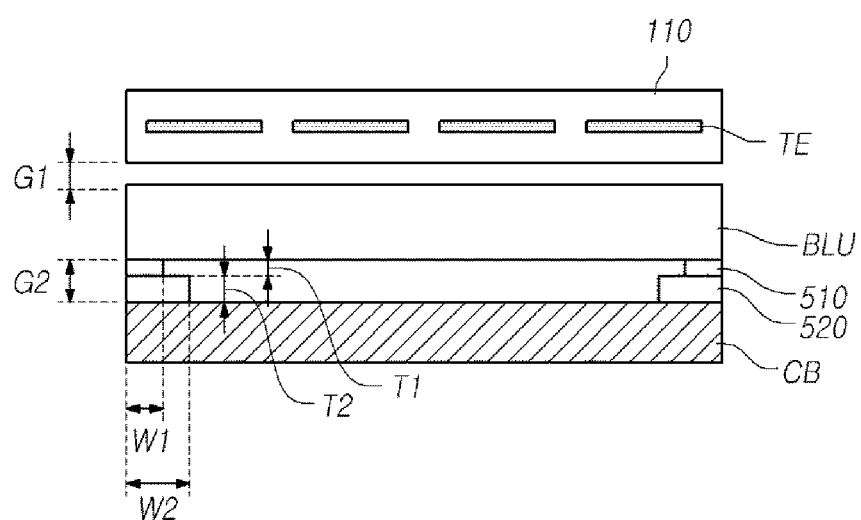
FIG. 6 illustrates another touching force sensing structure of the touch display device according to an embodiment of the present invention.

The top margins (i.e. the margins of the top surface) of the cover bottom CB may be bonded to the margins of the backlight unit BLU via the single bonding material 500, as illustrated in FIG. 5. Alternatively, as illustrated in FIG. 6, the bonding material 500 may include a first bonding material 510 and a second bonding material 520. In some cases, the bonding material 500 by which the top margins of the cover bottom CB are bonded to the margins of the backlight unit BLU may include three or more sub-bonding materials.

Referring to FIG. 6, the bonding material 500 may include the first bonding material 510 bonded to the bottom margins of the backlight unit BLU and the second bonding material 520 bonding the first bonding material 510 and the cover bottom CB to each other.

The first bonding material 510 and the second bonding material 520 may be bonded to each other.

The first bonding material 510 and the second bonding material 520 may be the same material or different materials.

For example, the first bonding material 510 may be tape, synthetic resin, such as polyethylene terephthalate (PET), or other bonding material suitable for bonding to the backlight unit BLU. The second bonding material 520 may be synthetic resin or tape.

Referring to FIG. 6, a total thickness T1+T2 of the thickness T1 of the first bonding material 510 and the thickness T2 of the second bonding material 520 may be equal to the size of the second gap G2 when no touching force has been applied to the top portion of the display panel 110.

That is, the total thickness T1+T2 of the thickness T1 of the first bonding material 510 and the thickness T2 of the second bonding material 520 may be equal to the size of the second gap G2 corresponding to the distance between the backlight unit BLU and the cover bottom CB.

As described above, when the bonding characteristics of the cover bottom CB are different from the bonding characteristics of the backlight unit BLU, the first bonding material 510 having high bondability to the backlight unit BLU and the second bonding material 520 having high bondability to the cover bottom CB may be used to improve the bonding force between the top margins of the cover bottom CB and the bottom margins of the backlight unit BLU.

The width W1 of the first bonding material 510 may be equal to the width W2 of the second bonding material 520, or as illustrated in FIG. 6, may be smaller than the width W2 of the second bonding material 520.

As described above, when the size of the second gap G2 is also changed by touching force, the width W1 of the first bonding material 510 bonded to the bottom margins of the backlight unit BLU may be further reduced to facilitate changes in the size of the second gap G2.

As described above, the second gap G2 between the cover bottom CB and the backlight unit BLU may be formed by the bonding material 500 between the cover bottom CB and the backlight unit BLU or may be formed by upwardly-protruding portions of the cover bottom CB or downwardly-protruding portions of the backlight unit BLU.

For example, in an area in which the cover bottom CB supports the bottom margins of the backlight unit BLU, the cover bottom CB may have the upwardly-protruding portions supporting the bottom margins, or alternatively, the backlight unit BLU may have the downwardly-protruding portions protruding from the bottom margins toward the cover bottom CB.

The upwardly-protruding portions or the downwardly-protruding portions as stated above may protrude from positions corresponding to the bonding material 500 to a size (height) corresponding to the thickness of the bonding material 500.

Next, the first gap-forming structure that separates the display panel 110 and the backlight unit BLU from each other to form the first gap G1 will be described.

Figure 7:
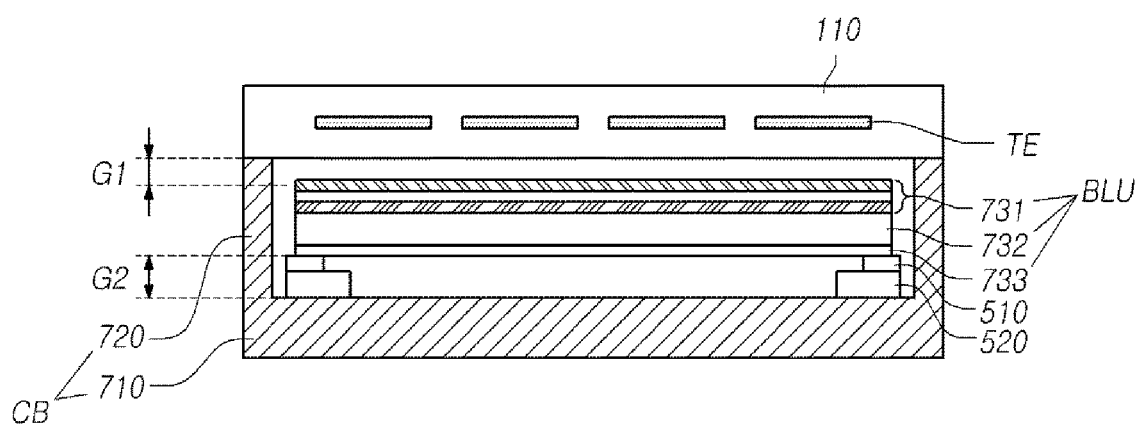
FIG. 7 illustrates another touching force sensing structure of the touch display device according to an embodiment of the present invention.
Figure 8:
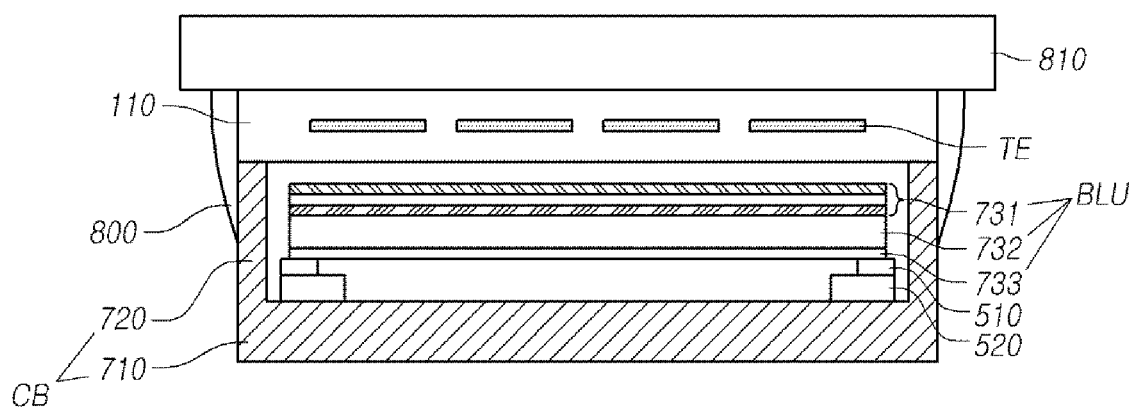
FIG. 8 illustrates another touching force sensing structure of the touch display device according to an embodiment of the present invention.

FIG. 7 and FIG. 8 illustrate other exemplary structures in which the cover bottom CB is positioned not only below but also on the sides of the backlight unit BLU.

Referring to FIG. 7 and FIG. 8, the backlight unit BLU includes a light source, a light guide plate 732, a sheet 731 disposed on the light guide plate 732, a reflector 733 disposed below the light guide plate 732, and other light distribution components.

Referring to FIG. 7 and FIG. 8, the cover bottom CB includes a body 710 disposed below the backlight unit BLU and side sections 720 extending from the body 710 and positioned to face the sides of the backlight unit BLU.

Referring to FIG. 7 and FIG. 8, the side sections 720 of the cover bottom CB support the bottom margins of the display panel 110.

The side sections 720 of the cover bottom CB are positioned higher than the top surface of the backlight unit BLU in the direction of the display panel 110 to support the bottom margins of the display panel 110.

The uppermost point of the side sections 720 of the cover bottom CB is positioned higher than the top surface of the backlight unit BLU in the direction of the display panel 110.

With this configuration, as illustrated in FIG. 7 and FIG. 8, the portions of the bottom surface of the display panel 110 other than the bottom margins is spaced apart from the top surface of the backlight unit BLU, thereby forming the first gap G1 between the display panel 110 and the backlight unit BLU.

Since the height of the uppermost point of the side sections 720 of the cover bottom CB is different from the height of the top surface of the backlight unit BLU, the backlight unit BLU is spaced apart from the display panel 110. The space or distance by which the backlight unit BLU is spaced apart from the display panel 110 is referred to as the first gap G1.

As described above, the first gap G1 between the backlight unit BLU and the display panel 110 may be formed by the side sections 720 of the cover bottom CB, or alternatively, may be formed by any gap-forming member other than the side sections 720 of the cover bottom CB.

That is, the backlight unit BLU and the display panel 110 may be spaced apart from each other via the gap-forming member other than the side sections 720 of the cover bottom CB.

In this case, the cover bottom CB may have a flat structure positioned only below the backlight unit BLU.

The gap-forming member for forming the first gap G1 may include at least one selected from among the bonding material, the upwardly-protruding portions of the backlight unit BLU, the downwardly-protruding portions of the display panel 110, and other structures (e.g. a side structure such as a guide panel).

Referring to FIG. 8, a pliable cover glass 810 that is capable of being slightly bent is positioned on the display panel 110.

Referring to FIG. 8, an adhesive 800 is bonded to the outer surfaces of the side sections 720 of the cover bottom CB and the side surfaces of the display panel 110.

It is advantageous in terms of a narrow bezel design to reduce the width of the side sections 720 of the cover bottom CB. In this case, when the side sections 720 of the cover bottom CB and the bottom margins of the display panel 110 are bonded using a bonding material or the like, the level of bonding force may be reduced.

Thus, as described above, the adhesive 800 is bonded to the side surfaces of the side section 720 of the cover bottom CB and the side surfaces of the display panel 110 to strongly bond the display panel 110 and the cover bottom CB to each other while facilitating the realization of the narrow bezel design.

Figure 9:
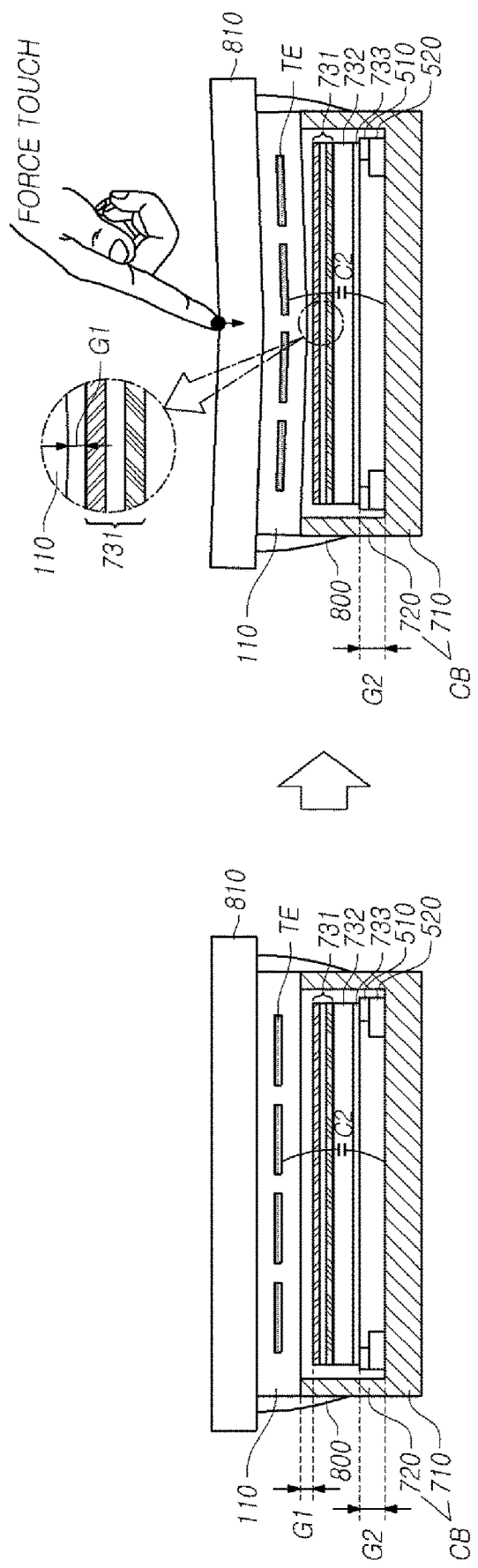
FIG. 9 illustrates changes in the size of a gap in response to a force touch in the touch display device according to an embodiment of the present invention.

FIG. 9 illustrates changes in the size (thickness) of a gap in response to a force touch in the touch display device 100 according to an embodiment of the present invention.

Referring to FIG. 9, when a force touch has occurred, i.e. when a pointer presses against the display panel 110 by applying force thereto, the display panel 110 bends slightly downwardly. Thus, in response to the force touch, the size (thickness) of the first gap G1 present between the display panel 110 and the backlight unit BLU is reduced.

This reduces the total size (thickness) of the gaps G1 and G2 present between the display panel 110, having the touch electrodes TE disposed therein, and the cover bottom CB.

Thus, the force touch causes changes in the second capacitances between the touch electrodes TE and the cover bottom CB.

The touch circuit 120 can sense a force touch by determining the presence of the force touch based on changes in the second capacitances C2 or determining the magnitude or level of the force touch based on the amounts of changes in the second capacitances C2.

Hereinabove, the touch display device 100 and the configuration thereof have been described with reference to FIG. 1 to FIG. 9, in which the cover bottom CB, designed to accommodate and protect the display panel 110, the backlight unit BLU, and other display components, acts as the counter electrode to the touch electrodes TE disposed within the display panel 110 and is used as one of the force sensors.

Hereinafter, a description will be made to the touch display device 100, in which the counter electrode to the touch electrodes TE is disposed on the cover bottom CB and the cover bottom CB does not act as the counter electrode.

Figure 10:
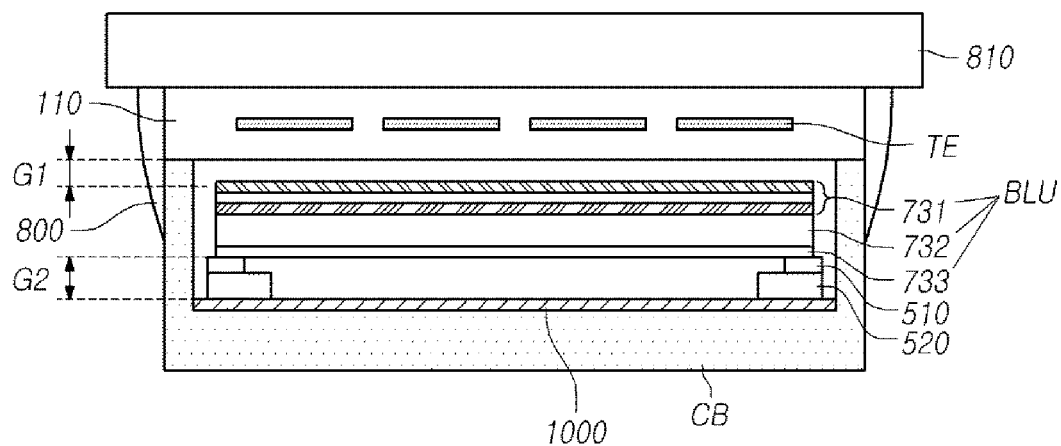
FIG. 10 illustrates another touching force sensing structure of the touch display device according to an embodiment of the present invention.

FIG. 10 illustrates another touching force sensing structure of the touch display device 100 according to an embodiment of the present invention.

Hereinafter, differences between the touch display device 100 illustrated in FIG. 10 and the touch display device 100 illustrated in FIG. 1 to FIG. 9 will be described.

Referring to FIG. 10, the touch display device 100 according to the embodiments includes a display panel 110 having a plurality of touch electrodes TE disposed therein, a cover bottom CB disposed below the display panel 110, and a conductive layer, such as conductive plate 1000, disposed on the cover bottom CB, in which a specific voltage is applied to the conductive plate 1000.

The conductive plate 1000 disposed on the cover bottom CB is a counter electrode to the touch electrodes TE disposed within the display panel 110. The conductive plate 1000 acts as the force sensors together with the touch electrodes TE disposed within the display panel 110.

Referring to FIG. 10, at least one gap G is present between the display panel 110 and the conductive plate 1000.

Referring to FIG. 10, a first gap G1 is present between the bottom surface of the display panel 110 and the top surface of the backlight unit BLU, while a second gap G2 is present between the bottom surface of the backlight unit BLU and the conductive plate 1000.

With this configuration, a second driving signal DS2 having a specific voltage (e.g. a ground voltage) is applied to the conductive plate 1000 disposed on the cover bottom CB instead of being applied to the cover bottom CB. Thus, the second driving signal DS2 can be reliably applied, whereby an amount of touching force may be more accurately and reliably sensed.

As an alternative to the configuration shown in FIG. 10, the conductive plate 1000 may be formed as a pattern of a plurality of conductive plates which may be mapped to specific functions upon sensing a touch force.

The cover bottom CB as described above may also be referred to as a bottom cover, a back cover, or a lower case.

The touch display device 100 according to the embodiments as described above may be a medium-sized or larger display device or a mobile terminal, such as a smartphone.

According to the embodiments as set forth above, the touch display device 100 not only can sense touched coordinates (i.e. a touch position) when a touch has occurred but also sense an amount of touching force with which a user presses against the display panel to cause the touch.

In addition, according to the embodiments, the touch display device 100 uses the existing components (e.g. the touch electrodes TE, the cover bottom CB, or so on) as the force sensors without additionally including separate structures or members as the force sensors, whereby the touch display device 100 can be compact and easy to fabricate.

Furthermore, according to the embodiments, the touch display device 100 has a touching force sensing structure able to improve image quality.

In addition, according to the embodiments, the touch display device 100 has the touching force sensing structure (the dual gap structure) able to increase a side viewing angle.

Furthermore, according to the embodiments, the touch display device 100 has the touching force sensing structure (the dual gap structure) able to improve the optical characteristics of the backlight unit.

In addition, according to the embodiments, the touch display device 100 has the touching force sensing structure (the dual gap structure) allowing a narrow bezel design to be effectively realized.

The foregoing descriptions and the accompanying drawings have been presented in order to explain the certain principles of the present disclosure. A person skilled in the art to which the disclosure relates can make many modifications and variations by combining, dividing, substituting for, or changing the elements without departing from the principle of the disclosure. The foregoing embodiments disclosed herein shall be interpreted as illustrative only but not as limitative of the principle and scope of the disclosure. It should be understood that the scope of the disclosure shall be defined by the appended Claims and all of their equivalents fall within the scope of the disclosure.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

What is claimed is:

1. A touch display device comprising:
a display panel having a plurality of touch electrodes disposed therein, a first driving signal being applied to the plurality of touch electrodes;
a backlight unit disposed below the display panel; and
a cover bottom disposed below the backlight unit,
wherein at least a portion of the cover bottom is spaced apart from the backlight unit to form a gap,
wherein a second driving signal is applied to the cover bottom while the first driving signal is being applied to at least one touch electrode among the plurality of touch electrodes,
wherein the cover bottom supports a bottom margin along a border of the backlight unit,
wherein a portion of the cover bottom supporting the bottom margin of the backlight unit is bonded to the bottom margin of the backlight unit via a bonding material,
wherein the bonding material comprises:
a first bonding material bonded to the bottom margin of the backlight unit; and
a second bonding material bonding the first bonding material to the cover bottom,
wherein a total of a thickness of the first bonding material and a thickness of the second bonding material corresponds to a distance between the backlight unit and the cover bottom, and
wherein a width of the first bonding material is smaller than the width of the second bonding material.

2. The touch display device according to claim 1, wherein, in an area in which the cover bottom supports the bottom margin of the backlight unit, the cover bottom has an upwardly-protruding portion supporting the bottom margin of the backlight unit or the backlight unit has a downwardly-protruding portion protruding from the bottom margin thereof toward the cover bottom.

3. The touch display device according to claim 1, wherein a thickness of the bonding material corresponds to the distance between the backlight unit and the cover bottom.

4. The touch display device according to claim 1, wherein the backlight unit and the display panel are spaced apart from each other via a gap-forming member.

5. The touch display device according to claim 4, wherein the gap-forming member comprises at least one selected from among a bonding material, an upwardly-protruding portion of the backlight unit, and a downwardly-protruding portion of the display panel.

6. The touch display device according to claim 1, wherein the cover bottom comprises:
a body disposed below the backlight unit; and
a side section disposed on a side of the backlight unit,
wherein the side section supports a bottom margin along a border of the display panel, and
wherein an uppermost point of the side section is positioned higher than a top surface of the backlight unit in a direction of the display panel.

7. The touch display device according to claim 6, wherein the backlight unit and the display panel are spaced apart from each other due to a difference in height between the uppermost point of the side section and the top surface of the backlight unit.

8. The touch display device according to claim 6, wherein an adhesive is bonded to an outer surface of the side section of the cover bottom and a side surface of the display panel.

9. The touch display device according to claim 1, further comprising a touch circuit, wherein, in a state in which the second driving signal is applied to the cover bottom, after the first driving signal has been applied to the at least one touch electrode among the plurality of touch electrodes, the touch circuit determines at least one among presence, magnitude, and level of touching force by receiving a signal through the at least one touch electrode.

10. The touch display device according to claim 1, wherein each of the first driving signal and the second driving signal comprises a pulse signal or a signal having a DC voltage, and the first driving signal and the second driving signal have a voltage difference or a phase difference therebetween.

11. The touch display device according to claim 1, wherein the second driving signal comprises a ground voltage.

12. The touch display device according to claim 1, wherein the gap by which the backlight unit and the cover bottom are spaced apart from each other comprises an air gap or a dielectric gap.

13. A touch display device comprising:
a display panel having a plurality of touch electrodes disposed therein, a first driving signal being applied to the plurality of touch electrodes; and
a cover bottom disposed below a backlight unit,
wherein at least one gap is present between the display panel and the cover bottom,
wherein at least a portion of the cover bottom comprises a conductive material or a composition of the cover bottom comprises a conductive material,
wherein a second driving signal is applied to the cover bottom while the first driving signal is being applied to at least one touch electrode among the plurality of touch electrodes,
wherein the cover bottom supports a bottom margin along a border of the backlight unit,
wherein a portion of the cover bottom supporting the bottom margin of the backlight unit is bonded to the bottom margin of the backlight unit via a bonding material,
wherein the bonding material comprises:
a first bonding material bonded to the bottom margin of the backlight unit; and
a second bonding material bonding the first bonding material to the cover bottom,
wherein a total of a thickness of the first bonding material and a thickness of the second bonding material corresponds to a distance between the backlight unit and the cover bottom, and
wherein a width of the first bonding material is smaller than the width of the second bonding material.

14. The touch display device according to claim 13, wherein a thickness of the at least one gap varies based on a bending amount of the display panel.

15. A touch display device comprising:
a display panel having a plurality of touch electrodes disposed therein, a first driving signal being applied to the plurality of touch electrodes;
a cover bottom disposed below a backlight unit; and
a conductive plate disposed on the cover bottom,
wherein at least one gap is present between the display panel and the conductive plate,
wherein a second driving signal is applied to the conductive plate while the first driving signal is being applied to at least one touch electrode among the plurality of touch electrodes,
wherein the cover bottom supports a bottom margin along a border of the backlight unit,
wherein a portion of the cover bottom supporting the bottom margin of the backlight unit is bonded to the bottom margin of the backlight unit via a bonding material,
wherein the bonding material comprises:
a first bonding material bonded to the bottom margin of the backlight unit; and
a second bonding material bonding the first bonding material to the cover bottom,
wherein a total of a thickness of the first bonding material and a thickness of the second bonding material corresponds to a distance between the backlight unit and the cover bottom, and
wherein a width of the first bonding material is smaller than the width of the second bonding material.

16. The touch display device according to claim 15, wherein a thickness of the at least one gap varies based on a bending amount of the display panel.

\* \* \* \* \*